US005191307A

United States Patent [19]

Hashimoto et al.

[11] Patent Number: 5,191,307

[45] Date of Patent: Mar. 2, 1993

[54] DEFLECTION YOKE APPARATUS

[75] Inventors: Akira Hashimoto; Shinji Ohtsu, both of Nagaokakyo, Japan

[73] Assignee: Murata Mfg. Co., Ltd., Kyoto, Japan

[21] Appl. No.: 828,463

[22] Filed: Jan. 30, 1992

[30] Foreign Application Priority Data

Feb. 4, 1991 [JP] Japan ............................ 3-010606[U]

[51] Int. Cl.[5] ........................ H01H 1/00; H01H 5/00; H04N 5/645

[52] U.S. Cl. .................................... 335/214; 358/248

[58] Field of Search ............................... 335/210-214; 313/440; 358/248

*Primary Examiner*—Leo P. Picard
*Assistant Examiner*—Raymond Barrera
*Attorney, Agent, or Firm*—Allegretti & Witcoff, Ltd.

[57] ABSTRACT

A coil case with a coil receptacle for receiving a coil winding is formed integrally with cover flaps which are swingably joined to either end of the coil receptacle by hinge portions. The coil case has mounting pawls formed thereon. The coil winding is received inside the coil case and the cover flaps are closed, whereby a leakage magnetic field cancellation coil is assembled. The cancellation coil is mounted onto the deflection yoke by engaging the mounting pawls with a part of the deflection yoke. Since the coil case and the cover flaps are formed integrally with each other, the number of component parts is reduced, thereby facilitating manufacture. Further, the size of the cancellation coil is reduced, thereby reducing the material costs, hence, the production costs of the apparatus. Since the cancellation coil can be mounted onto the deflection yoke by a single-step operation utilizing the mounting pawls, the efficiency of the mounting operation is improved.

5 Claims, 2 Drawing Sheets

DEFLECTION YOKE APPARATUS

BACKGROUND OF THE INVENTION

1. Field of the Invention

The present invention relates to a deflection yoke apparatus having a cancellation coil for canceling a leakage magnetic field leaking from the deflection yoke.

2. Description of the Related Art

Studies and reports have recently been made of the adverse influence on human bodies (especially in the case of pregnant women) caused by leakage magnetic fields leaking from the deflection yoke of the cathode-ray tube of a television receiver, a display or the like. Means, therefore, have become adopted to prevent the adverse influence of leakage magnetic fields leaking from the deflection yoke of such electronic equipment.

FIG. 1 illustrates a deflection yoke apparatus having a means for such prevention. The apparatus has a deflection yoke 1, and a leakage field cancellation coil 4 provided on the top side, the bottom side, or both of a large-diameter portion 3 of the head of a bobbin 2 of the yoke 1. The leakage field cancellation coil 4 comprises a ring-shaped coil winding (not shown) accommodated in a box-shaped coil case 5. When the coil case 5 accommodating the coil winding is covered with a coil cover 7 having a leg 6, the coil case 5 and the coil cover 7 are integrated with each other. An arm-shaped joint 10 having a bent base portion is mounted on an end face 8 of the large-diameter portion 3 (the face 8 being on the same side as the neck). When pawls 11 of the joint 10 are brought into engagement with engagement bores 12 in the leg 6 of the coil cover 7, the leakage magnetic field cancellation coil 4 is mounted onto the joint 10, hence, onto the deflection yoke 1.

With the deflection yoke apparatus having the leakage magnetic field cancellation coil 4, a leakage magnetic field leaking from the horizontal or vertical deflection coil(s) of the deflection yoke 1 is offset by a cancellation magnetic field generated by the leakage magnetic field cancellation coil 4. In this way, the leakage magnetic field leaking to the outside of the cathode-ray tube is diminished to thereby prevent adverse influence on human bodies.

However, the conventional deflection yoke apparatus has the following drawback. The provision of the leakage magnetic field cancellation coil 4 necessitates preparing the coil case 5 and the coil cover 7, which are separate members, as different formed products. This formation inevitably requires high material costs. In addition, the leakage magnetic field cancellation coil 4 inevitably forms a large assembly when the coil case 5 and the coil cover 7 are integrated together.

Another drawback comes from the manner in which the leakage magnetic field cancellation coil 4 is mounted onto the deflection yoke 1, that is, the mounting of the cancellation coil 4 being accomplished through the intervention of the joint 10. This means an increase in the number of component parts. In addition, the operation of assembling the leakage magnetic field cancellation coil 4 assembly, and mounting the cancellation coil 4 onto the deflection yoke 1 is complicated, and has poor operational efficiency.

SUMMARY OF THE INVENTION

The present invention has been accomplished to eliminate the above-described drawbacks. An object of the present invention is to provide a deflection yoke apparatus capable of: reducing the number of component parts to thereby improve the efficiency of the operation of assembling a leakage magnetic field cancellation coil and mounting the coil onto the deflection yoke; and achieving a reduction in the size of the leakage magnetic field cancellation coil as well as a reduction in the production costs.

In order to achieve the above object, according to the present invention, there is provided a deflection yoke apparatus comprising: a deflection yoke; and a leakage magnetic field cancellation coil mounted on a large-diameter portion of the head of the bobbin of the deflection yoke, the leakage magnetic field cancellation coil comprising a coil winding received in a coil receptacle of a coil case, the coil case having a mounting portion by which the coil case is mounted onto the deflection yoke, a cover for closing a coil receptacle opening through which the coil is received, and a hinge by which the cover is swingably joined to one end of the coil receptacle, the cover being formed integrally with the coil case with the hinge positioned between the coil receptacle and the cover.

With the above-specified construction of the deflection yoke apparatus, when the coil winding is received in the coil receptacle of the coil case by inserting the coil winding from the coil receptacle opening, and the cover is swung about the axis of the hinge to close the coil receptacle opening, the coil winding is received inside the coil case while insulated from the exterior. When the coil case accommodating the coil winding is mounted onto the deflection yoke by the mounting portion, the leakage magnetic field cancellation coil is mounted to a certain predetermined position of the deflection yoke.

DESCRIPTION OF THE PREFERRED EMBODIMENT

Figure 1:
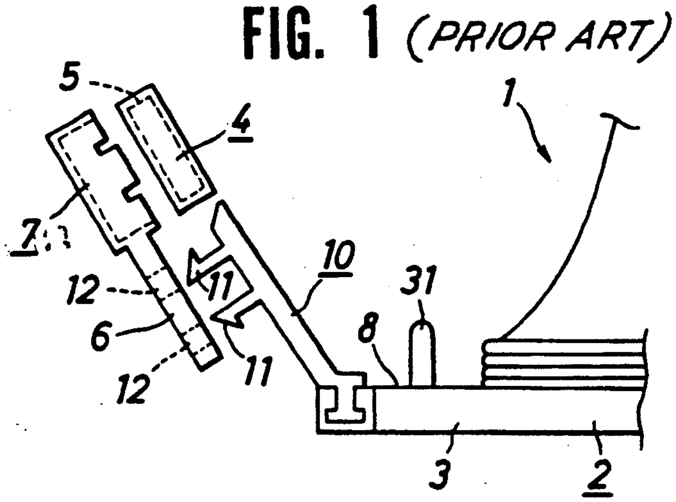
FIG. 1 (PRIOR ART)
FIG. 1 is a view for illustrating a conventional deflection yoke apparatus having a leakage magnetic field cancellation coil.
Figure 2:
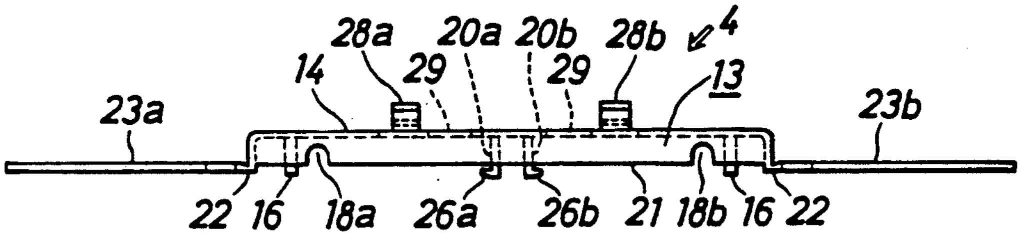
FIG. 2 is a top view of an integral structure in a leakage magnetic field cancellation coil of a deflection yoke apparatus according to an embodiment of the present invention, said integral structure being formed by a coil case integral with cover flaps.

An embodiment of the present invention will now be described with reference to the drawings. In the description of the embodiment, component parts corresponding to those of the conventional apparatus will be designated by identical reference numerals, and their detailed description which need not be repeated will be omitted.

Figure 3:
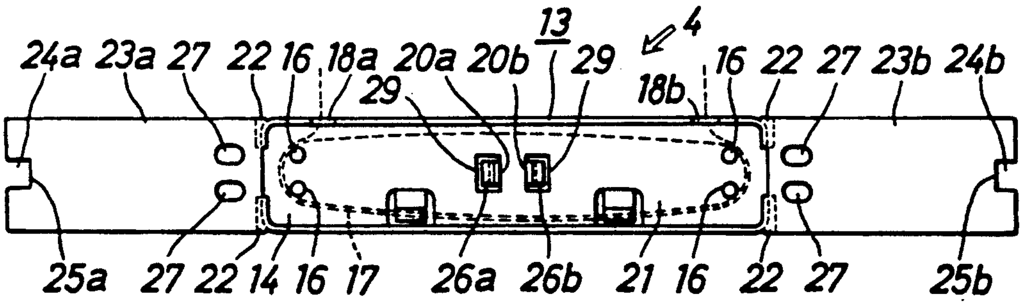
FIG. 3 is a front view of the essential parts of the deflection yoke apparatus shown in FIG. 2.
Figure 4:
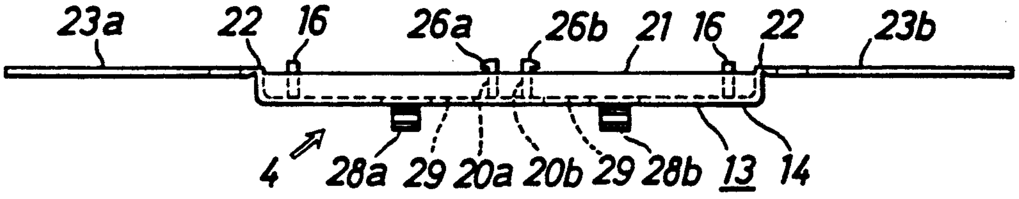
FIG. 4 is a bottom view of the integral structure shown in FIG. 2.

FIGS. 2 to 5 show the essential parts of an embodiment of the deflection yoke apparatus according to the present invention. Referring to these figures, the inside of a box-shaped coil case 13 defines a coil receptacle 21. A plurality of pins 16, projecting into the coil receptacle 21, are provided on the inner surface of a bottom 14 of the coil case 13 and positioned close to either end (left and right ends, as viewed in FIGS. 2 to 4) of the receptacle 21. A ring-shaped coil winding 17 is wound around the pins 16, and is thus received inside the coil case 13, as shown in FIG. 3. Two end portions of the coil winding 17 are extended to the outside of the apparatus through notches 18*a* and 18*b* formed in the upper side wall of the coil case 13. A pair of holding pawls 20*a* and 20*b* project from central positions of the inner surface of the bottom 14, and extend through the coil receptacle 21 to a height beyond the surface defined by the opening of the coil receptacle 21. The holding pawls 20*a* and 20*b* have distal-end pawl portions 26*a* and 26*b*, respectively.

Double-door shaped cover flaps 23*a* and 23*b* (together constituting the cover) are swingably joined to the left and right ends of the coil receptacle 21 of the coil case 13 by hinge portions 22 (together constituting the hinge). The cover flaps 23*a* and 23*b* are swingable about the axis of the hinge portions 22 through an angle of 180°. The coil case 13, the hinge portions 22, and the cover flaps 23*a* and 23*b* are formed integrally with each other by using an insulating synthetic resin such as polypropylene. Notches 24*a* and 24*b* are formed in the center of the distal ends of the cover flaps 23*a* and 23*b*, respectively. The notches 24*a* and 24*b* have inner bottom edges which define engagement surfaces 25*a* and 25*b*, respectively. When the cover flaps 23*a* and 23*b* are swung toward each other, and the engagement surfaces 25*a* and 25*b* are respectively brought into engagement with the distal-end pawl portions 26*a* and 26*b*, the opening of the coil receptacle 21 of the coil case 13 is closed by the cover flaps 23*a* and 23*b*. The position in which the cover flaps 23*a* and 23*b* close the coil receptacle opening is maintained by the engagement of the engagement surfaces 25*a* and 25*b* with the distal-end pawl portions 26*a* and 26*b*, respectively. The cover flaps 23*a* and 23*b* are formed with bores through which pins 16 project when the cover flaps 23*a* and 23*b* are closed. Reference numeral 29 designates through-holes used to draw mold parts during injection molding.

Figure 5:
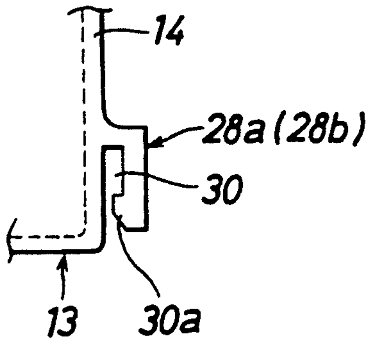
FIG. 5 is a view for illustrating mounting pawls of the coil case.

A pair of mounting pawls 28*a* and 28*b* (together constituting the mounting portion) are formed on the outer surface of the bottom 14 of the coil case 13. As shown in FIG. 5, each mounting pawl 28*a* or 28*b* extends from a position on the outer surface of the bottom 14 toward the lower side wall of the case 13 in such a manner that a gap 30 is defined between a distal end portion of the mounting pawl 28*a* or 28*b* and the outer surface. Each mounting pawl 28*a* or 28*b* has a protrusion at the distal end, the protrusion serving as a pawl portion 30*a*.

The leakage magnetic field cancellation coil 4 characterizing the deflection yoke apparatus according to the present invention is assembled, and mounted onto the deflection yoke 1 in the following manner. First, the ring-shaped coil winding 17 is wound around the pins 16 and received inside the coil case 13. Then, the cover flaps 23*a* and 23*b* are closed until the engagement surfaces 25*a* and 25*b* of the cover flaps 23*a* and 23*b* respectively engage with the holding pawls 20*a* and 20*b*, whereupon the cover flaps 23*a* and 23*b* becomes held in their closed position. In this condition, a mounting operation is performed. When, for instance, portions of a rib plate 31 (such as that shown in FIG. 1) projecting from the neck-side end face 8 of the deflection yoke 1 are inserted into the gaps 30 between the distal end portions of the mounting pawls 28*a* and 28*b*, on one hand, and the outer surface of the bottom 14, on the other, the pawl portions 30*a* of the mounting pawls 28*a* and 28*b* are brought into clamping engagement, in cooperation with the outer surface of the bottom 14, with the mated portions of the rib plate 31. In this way, the leakage magnetic field cancellation coil 4 can be easily mounted onto the deflection yoke 1 by a single-step operation. When the cancellation coil 4 is thus mounted, the two end portions of the coil winding 17 are connected to, for instance, the horizontal deflection coil(s) so that a leakage magnetic field leaking from the horizontal deflection coil(s) is offset by a cancellation magnetic field generated by the leakage magnetic field cancellation coil 4 and having the opposite direction. Thus, the leakage magnetic field cancellation coil 4 serves to diminish the leakage magnetic field actually leaking to the outside of the associated equipment.

In the state where the leakage magnetic field cancellation coil 4 is mounted on the deflection yoke 1, the coil winding 17 is completely insulated from the exterior by the coil case 13 serving as an insulator. Accordingly, even when a terminal board connected with the horizontal or vertical deflection coil(s) is provided in an area in the vicinity of the coil case 13, the coil winding 17 is prevented from contacting any terminals on the terminal board. This makes it possible to prevent the horizontal and vertical deflection coils from contacting each other through the coil winding 17, thereby ensuring positive insulation of the horizontal and vertical deflection coils from each other.

The present invention is not intended to be limited by the above-described embodiment, and various embodiments may be carried out. For instance, although in the foregoing embodiment, the cover comprises double-door shaped cover flaps 23*a* and 23*b*, the cover may alternatively comprise a single-door shaped cover flap. Further, although in the foregoing embodiment, holding pawls 20*a* and 20*b* for holding the cover flaps 23*a* and 23*b* in position are provided at a location in the center of the coil case 13, the holding pawls 20*a* and 20*b* may be alternatively provided at another location, such as a location on the peripheral wall of the coil case 13. Still alternatively, the holding pawls 20*a* and 20*b* may be omitted. In this case, the cover flaps 23*a* and 23*b* are fixed together by, e.g., an adhesive, to maintain their closed position.

The foregoing embodiment illustrates a case where the coil winding 17 is connected to the horizontal deflection coil(s) so that the cancellation coil 4 serves as a coil for canceling very low magnetic frequency (VLMF) waves of a leakage magnetic field leaking from the horizontal deflection coil(s). However, the leakage magnetic field cancellation coil 4 of the apparatus according to the present invention may be used as a coil for canceling leakage magnetic fields having various frequency bands and leaking from the deflection yoke. For instance, the cancellation coil 4 may be used as a coil connected to the horizontal deflection coil(s) in order to cancel electromagnetic interference (EMI), or extremely low frequency (ELF) waves.

According to the present invention, the coil case for receiving the coil winding in the coil receptacle, and the cover are formed integrally with each other with the hinge positioned between the coil receptacle and the cover. This is advantageous in that the number of component parts is small, and the manufacture of the apparatus is considerably facilitated. Another advantage is that the leakage magnetic field cancellation coil is much smaller, thereby reducing the amount of the required material and, hence, reducing the production costs of the apparatus.

Also, the leakage magnetic field cancellation coil can be mounted onto the deflection yoke simply by attaching the mounting portion formed on the coil case to the deflection yoke. Thus, the mounting is easily performed by a single-step operation, thereby greatly improving the efficiency of the operation of mounting the leakage magnetic field cancellation coil onto the deflection yoke.

What is claimed is:

1. A deflection yoke apparatus comprising:

a deflection yoke; and a leakage magnetic field cancellation coil mounted on a large-diameter portion of the head of the bobbin of said deflection yoke, said leakage magnetic field cancellation coil comprising a coil winding received in a coil receptacle of a coil case, said coil case having a mounting portion by which said coil case is mounted onto said deflection yoke, a cover for closing a coil receptacle opening through which said coil is received, and a hinge by which said cover is swingably joined to one end of said coil receptacle, said cover being formed integrally with said coil case with said hinge positioned between said coil receptacle and said cover.

2. A deflection yoke apparatus according to claim 1 wherein said cover comprises cover flaps hingedly joined to the coil receptable for closing the coil receptacle opening.

3. A deflection yoke apparatus according to claim 1 wherein said coil case has a holding pawl for holding the cover.

4. A deflection yoke apparatus according to claim 3 wherein said holding pawl is provided on the bottom of the coil case.

5. A deflection yoke apparatus according to claim 3 wherein said holding pawl is provided on a wall of the coil case.

* * * * *